United States Patent [19]

Quentin et al.

[11] Patent Number: 5,208,745

[45] Date of Patent: May 4, 1993

[54] MULTIMEDIA INTERFACE AND METHOD FOR COMPUTER SYSTEM

[75] Inventors: George H. Quentin, San Jose, Calif.; Brian A. Isle, Isanti, Minn.; Charles P. Bloom, Eagan, Minn.; Arch W. Butler, Minneapolis, Minn.; David Spoor, Eden Prairie, Minn.; David J. Wunderlin, New Hope, Minn.; Renee Bedros, West Saint Paul, Minn.; Francis M. Campos, Sausalito; Stephen R. Sweet, Sonoma, both of Calif.

[73] Assignee: Electric Power Research Institute, Palo Alto, Calif.

[21] Appl. No.: 532,596

[22] Filed: Jun. 4, 1990

Related U.S. Application Data

[63] Continuation-in-part of Ser. No. 223,499, Jul. 25, 1988, Pat. No. 4,931,950.

[51] Int. Cl.[5] .................... G06F 15/46; G06F 11/30
[52] U.S. Cl. .................... 364/188; 364/551.01; 364/579; 395/11; 395/12; 395/50; 395/154; 395/161; 395/163; 395/911
[58] Field of Search ................. 364/184–187, 364/138, 139, 188, 189, 550, 551.01, 579, 580, 131–136; 371/29.1, 16.4, 18; 358/107; 395/153, 154, 157, 158, 161, 163, 50, 911, 912, 913, 914, 11, 12

[56] References Cited

U.S. PATENT DOCUMENTS

| 4,639,881 | 1/1987 | Zingher | 395/161 |
|---|---|---|---|
| 4,644,478 | 2/1987 | Stephens et al. | 364/188 X |
| 4,654,852 | 3/1987 | Bentley et al. | 371/29.1 |
| 4,757,463 | 6/1988 | Ballou et al. | 364/551.01 |
| 4,815,014 | 3/1989 | Lipner et al. | 364/550 |
| 4,858,152 | 8/1989 | Estes et al. | 364/185 X |
| 5,006,976 | 4/1991 | Jundt | 364/185 X |

FOREIGN PATENT DOCUMENTS 0273435 12/1987 European Pat. Off. .

OTHER PUBLICATIONS

Koch et al.—"IEEE Trans. on Energy conversion'—'—vol. 3, No. 1, Mar. 1988, New York, N.Y., pp. 71–77.
Christodoulakis et al.—"Browsing Within Time—Driven Multimedia Documents"—Conference on Office Information Systems; Mar. 23, 1988, Palo Alto, Calif., pp. 219–227.
Gibbs et al.—"Muse: A Multimedia Filing System"; IEEE Software; vol. 4, No. 2, Mar. 1987, New York, N.Y., p. 414.
European Search Report/89909367.8 (US 8903111)/Apr. 21, 1992 (ref REC/AOS/P36558).

*Primary Examiner*—Joseph Ruggiero
*Attorney, Agent, or Firm*—Flehr, Hohbach, Test, Albritton & Herbert

[57] ABSTRACT

A multimedia interface presents information and receives user commands and data for a computer system. The multimedia interface operates in parallel with another application software module, such as an expert system. To add multimedia features to the application software module, the module is modified so as to generate multimedia commands at the same time as it displays text on a text monitor. The multimedia commands, which are held in a queue, provide additional information in the form of video images and generated speech corresponding to the displayed text. In addition, the multimedia commands are split into at least two sets: one set which is dispatched to the user substantially immediately after displaying the corresponding text; and one set which is dispatched upon request by the user. In the preferred embodiment, the multimedia interface presents information to the user through text, graphics, video, sound, speech production, and printed output. User inputs are made through a keyboard and voice recognition. In one preferred embodiment two data processing units are used: one for an expert system module and one for a video output processing module. Each module includes its own flat VGA display. The video module includes a digital video controller which enables it to display drawings, photographs, still and animated graphics, video stills, full-motion video and motion video with graphic overlays. An optional satellite station facilitates use of the system in environments where it is inconvenient or impossible to bring the complete system.

14 Claims, 10 Drawing Sheets

MULTIMEDIA INTERFACE AND METHOD FOR COMPUTER SYSTEM

This is a continuation-in-part of Ser. No. 07/223,499 filed Jul. 25, 1988, entitled MULTIMEDIA INTERFACE AND METHOD FOR COMPUTER SYSTEM, issued as U.S. Pat. No. 4,931,950 on Jun. 5, 1990.

The present invention relates to the human interface aspects of computer systems, and particularly to systems and methods for adding video and voice capabilities to expert computer systems.

BACKGROUND OF THE INVENTION

The effectiveness of many computer systems is a function not only of the application software program which interacts with the user, but also a function of how well the computer system communicates with its human users.

In terms of expert systems, effectiveness is a function not only of the knowledge applied to its task domain, but also the delivery of that knowledge to the end user. In spite of the recent strides that have been made in expert system theory and development, no one has produced a truly effective delivery vehicle for communicating with the users of these systems.

Most expert systems are either implemented on a main frame computer and accessed through a terminal, or they are ported to smaller personal computers. In either case the human-computer dialogue passes through a standard text screen or monitor in one direction, and through a standard "QWERTY" keyboard in the other direction. This keyboard/monitor interface is not an interface that optimizes system performance.

In a large number of situations, the standard keyboard/monitor mode of communication is inadequate or not suitable. For instance, in situations where the user's hands are busy, keyboard input is clearly difficult. When the user must visually concentrate on a task, it may be dangerous for the user to avert his eyes so as to look at a computer screen. In other situations, computer monitors are inadequate visual media for conveying information needed by the user. For instance, computer monitors generally cannot be used to display photographic images or moving video pictures, such as a movie sequence showing what a particular piece of equipment looks like, or how to disassemble that piece of equipment to effect a particular repair.

All of the communication modules required for a multimedia interface, such as voice recognition modules, text-to-speech voice production modules, random access video memories and video displays are commercially available. However, these multimedia communication modules have generally not been incorporated into expert systems because of the difficulty of adding multimedia features to an existing expert system, or to a system for building expert systems. That is, there was an implicit assumption that one would have to totally redesign and rebuild an expert system's knowledge base and control software in order to incorporate multimedia features.

In other word words, the primary problem has been the difficulty of integrating the multimedia modules with traditional expert systems. It is therefore an object of the present invention to provide a multimedia software interface that can be added to an expert system with minimal changes to the expert system.

Another potential problem with a multimedia expert system is that increasing the number of communication modules increases the number of ways that the system can fail. It is therefore another object of the present invention to provide a modular multimedia software interface where the failure of any input or output channel does not impact the functionality of the remaining parts of the expert system.

Still another potential problem with building a multimedia expert system is that the multimedia features would be needed or useful mostly in situations requiring that the expert system be portable. While powerful portable computers are now available, these computers generally do not include voice input, voice output, video output and a printer because it has been assumed that the inclusion of all of these features would make the resulting system nonportable.

It is therefore an object of the present invention to provide a portable multimedia expert system delivery vehicle which weighs no more than 30 pounds, and is truly portable.

SUMMARY OF THE INVENTION

In summary, the present invention provides a multimedia interface, which presents information and receives user commands, for a computer system. The multimedia interface operates in parallel with another application software module, such as an expert system. To add multimedia features to the application software module, the module is modified so as to generate multimedia commands at the same time as it displays text on a text monitor. The multimedia commands, which are held in a queue, provide additional information in the form of video images and generated speech corresponding to the displayed text. In addition, the multimedia commands are split into at least two sets: one set which is dispatched to the user substantially immediately after displaying the corresponding text, and one set which is dispatched only upon request by the user.

In the preferred embodiment, information is presented through text, graphics, video, speech production, and printed output; control inputs are made through a special-function keypad and voice recognition. The preferred embodiment is a portable expert system which fits in a single portable suitcase sized package.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

The preferred embodiment of the present invention is a multimedia interface for an expert system. It should be understood, however, that the present invention can be used with many types of computer systems and many types of application software programs.

Overview of the Preferred Embodiment

Figure 1:
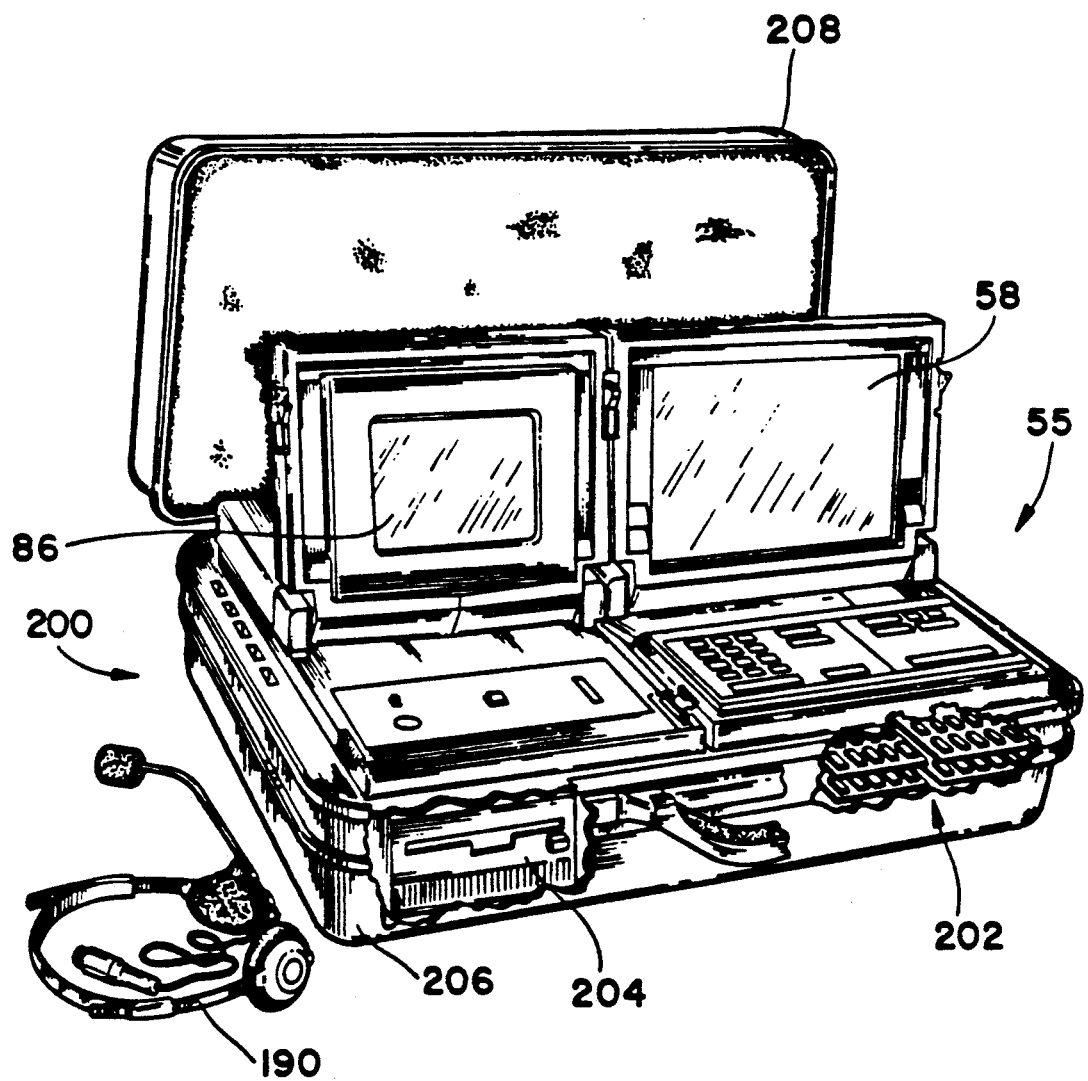
FIG. 1 is a perspective, partially cut away view of a prototype of a portable expert system incorporating the present invention.

The preferred embodiment of the present invention shown in FIG. 1 is a portable computer system incorporating a multimedia implementation of an expert system known as The Expert Adviser for Combustion Turbines, developed under a contract with the Electric Power Research Institute. This is a knowledge-based system designed to aid maintenance electricians when troubleshooting gas turbine power plant control systems. This knowledge base contains procedural knowledge for operating, maintaining, and troubleshooting electromechanical equipment, controls, and accessories.

In a prototype of the present invention the expert system was used for ground-fault detection. The ground-fault detection task is a good application for an expert system because it is characterized by a complex network of symptoms, complicated fault-isolation logic, and a considerable variance in the success rate and time-to-repair attributable to the technician's expertise. The work is performed in an environment that is cramped and has temperature extremes, excessive noise, and poor lighting. These environmental factors add to the desirability of providing the worker with a cognitive aiding device.

In order for an expert system to be usable and useful in the above described working conditions, it needs to be portable and able to communicate with the user when the user's hands are busy and also when the user's eyes need to be focused on the task at hand rather than on a computer or video display. As a result, an expert system for ground fault detection in gas turbine plants was determined to be a good test vehicle for the present invention.

Expert systems, as well as other computer systems, accept input from and present information to the end user in the form of a dialogue. A two-way exchange of information with an on-site, real-time system enhances the end user's perception of the system as an expert consultant. The system leads the user through a sequence of procedures culminating in the arrival at some desired end state, such as the answer to a question or a particular problem, an explanation of how a particular portion of a machine or system works, or an explanation of how to repair a particular piece of equipment.

The exact sequence of procedures performed and information provided by an expert system will depend on each user's needs and proficiency, but the end state reached should be user independent. From an expert user, the system may only request the minimum information needed for task completion. For less experienced users, the system can explain its requests by providing the user with additional information about the locations of various pieces of equipment and standard procedures, and can elaborate on acceptable responses.

The inventors have determined that the media options required for the most effective interaction between the user and an expert system are:

1. Input of user-commands via:
   a. fixed function keys;
   b. virtual (variable) function membrane keypads;
   c. voice recognition for receiving voiced user-commands.
2. Output of text, video images and speech via:
   a. text display;
   b. video display for user-graphics and interactive video imagery;
   c. speech generator;
   d. printer for printing hard copy of text and/or images.

The system's voice recognition vocabulary is redundant with the keyboard, the audio speaker is redundant with the text display, and the printer is redundant with and an enhancement to the text display. Redundancy does not mean "identical with." Each input/output mode is customized to the manner in which humans best utilize information on that particular channel. Any redundant or primary feature may be disabled without greatly degrading the functionality of the system.

Figure 2:
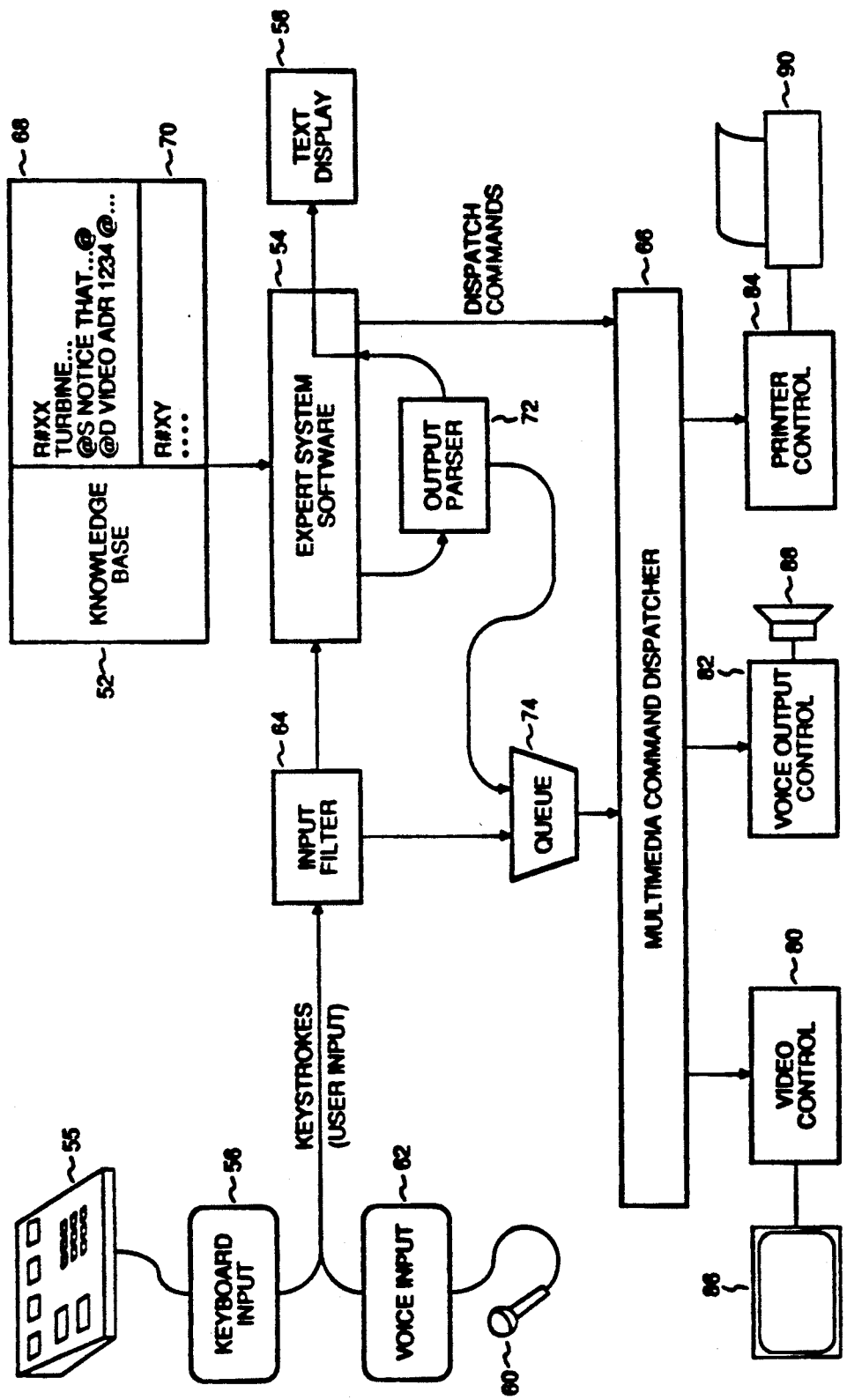
FIG. 2 depicts a conceptual flow chart of the flow of information in the present information.

Referring to FIG. 2, there is shown a conceptual flow chart of an expert system 50 incorporating the present invention. The basic components of the expert system 50, excluding the multimedia features of the present invention, are a knowledge base 52 (i.e., a database of information), an expert system software module 54, a keyboard 55, a keyboard input module 56, and a text display module 58. The keyboard 55 in the preferred embodiment includes several special function keys to facilitate ease of use, and the text display module is a high quality flat screen computer monitor of the type commonly found in portable computers.

The user can enter commands manually using the keyboard 55, and orally by speaking into a microphone 60. The oral commands are decoded by a voice input module 62 coupled to the microphone 60. As explained below, the set of oral commands accepted by the system is a superset of the commands which can be entered using the keyboard 55.

Inputs from the user are routed by the expert system software 54 to an input filter 64, which stores multimedia commands from the user in a queue 74, and passes the remaining user inputs back to the expert system software 54. As will be explained in more detail below, the queue 74 stores multimedia commands generated by both the user and the expert system software 54.

The expert system software module 54, sometimes called an inference engine, interprets the user's keyboard and voice inputs and selects a new set of information from the knowledge base 52 based on the current "location" of the user in the knowledge base and the user's inputs.

The resulting output strings generated by the expert system are processed by an output parser 72, which stores multimedia commands in the output strings on the queue 74 and passes the remainder of the output strings back to the expert system software 54 for display on the text display 58.

A dispatch routine 66 controls the execution of the multimedia commands stored in the queue 74. As shown in FIG. 2, the multimedia dispatcher 66 calls subroutines for the system's video controller 80, voice output controller 82 and printer controller 84 when these multimedia features are used. The resulting presentations are transmitted to a video screen 86, speaker 88, and printer 90.

Simplified Expert System Model.

For the purposes of this explanation, a somewhat simplified structure of the knowledge base 52 and the expert system software module 54 is assumed. In particular, referring to FIG. 2, it is assumed that the knowledge base 52 is made up of a large number of discrete records 68, 70 and so on, each of which contains text to be displayed by a text display module 58. The records in the knowledge base also contain information regarding the "context" of the record, and also some "multimedia" information which will be discussed in more detail below. In addition, it is assumed that the expert system software module 54 reacts to user inputs simply by selecting a new record or set of records in the knowledge base 52, or by staying at the currently selected record or set of records.

As will be understood by those skilled in the art, this simplified model of an expert system permits explanation of the present invention without having to consider the many variations and complexities of expert system designs. While the preferred embodiment generally follows the above described model, it should be understood that the present invention can be used with virtually any expert system as well as many types of application software programs. For example, the present invention could be used to provide multimedia features in computer assisted training programs, and database access programs. Another use contemplated by the inventors is a calibration assistance program, in which the program assists the user calibrate a particular device by providing video and audio messages as needed by the user.

Multimedia Information in Knowledge Base.

When using the present invention, the text information in the knowledge base 52 is supplemented with additional text and information for the multimedia interface. More specifically, the author of the knowledge base can embed into the text in each knowledge base record 68 a number of special multimedia commands. Three types of multimedia commands specify three types of messages to be delivered by the multimedia interface: verbal messages, text to be printed, and selected video images or video sequences.

Thus each record 68 in the knowledge base 62 can contain text to be displayed by the text display module 58 as well as messages to be presented by each of the multimedia output modules. Other special multimedia commands embedded in the knowledge base's text can instruct the multimedia interface to repeat a verbal or video message, clear the video screen, and so on.

As will be explained in more detail below, the text and multimedia commands in each record are formatted so that the information for each output module can be easily identified and separated from the other information in the record. The format and function of each of the multimedia commands is also explained in more detail below.

Embedded Multimedia Commands.

Multimedia commands are embedded in the records of the knowledge database simply by inserting the commands into the portion of the record that specifies the text to be displayed on the system's text monitor. The beginning and end of each command is marked by a special delimiter, such as the at sign, "@", or any other character Which is generally not used for other purposes. The first non-blank character following the beginning delimiter identifies the multimedia command.

The following is an example of the text in a knowledge base record, with an embedded multimedia command:

The circuit breakers on the right hand panel are as follows . . . @sLooking at the circuit panel on the right side of the cabinet, trip the third breaker from the bottom to turn off power to the . . .@

The symbols @s . . . @ denote the beginning and end of an "s" command, which denotes "Question Text", and the remainder of the command is a parameter string - explanatory text that will be spoken when this record is selected for output.

An example of a record which contains a command to clear the video screen is as follows:

Repair sequence is now complete. Close . . . @m@

The symbol @m@ denotes a command to clear the video screen.

Table 1, discussed below, shows the full set of multimedia commands used in the preferred embodiment.

Output Parser

When the expert system software module 54 selects a new record 68 or set of records, it would normally send the corresponding output string directly to a text display module 58 for formatting and displaying the text. The present invention changes that by having the expert system module 54 send the output string in the selected record or records to an output parser routine 72.

The parser 72 identifies the multimedia commands in the output string, removes each multimedia command from the output string and stores it in the queue 74, and passes the remaining text, if any, back to the expert system software module 54 for processing by the text display module 58.

More specifically, in embodiments using the above described embedded commands, the parser works as follows. The expert system software 54 passes an array of output information to the output parser 72. The output parser 72 searches for "@" command markers, and stores the string between each set of command markers at the end of the queue 74, thereby creating a new queue entry. As a result, all of the multimedia commands in the output array are stored in the queue 74. The command markers and the multimedia commands are also removed from the output array so that when the output parser 72 returns control to the expert system software 54, only text to be displayed on the text display 58 remains in the array of output information.

As will be explained in more detail below, the use of an output parser 72 as shown in FIG. 2 enables a multimedia interface to be integrated with an already existing expert system with minimal changes to the structure of the expert system's software module 54.

Queue Data Structure and Use.

Figure 3:
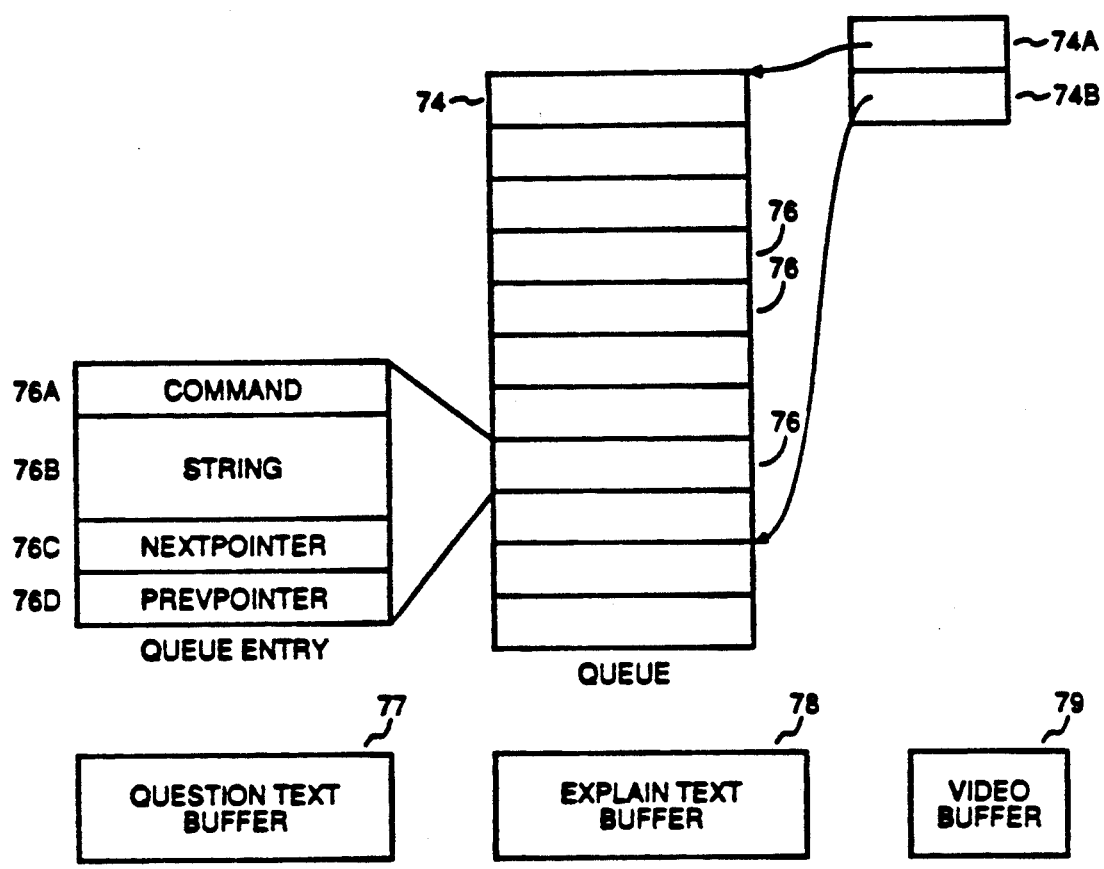
FIG. 3 is a diagram of the queue data structure used in a multimedia interface.

Referring to FIG. 3, the queue 74 is a linked list of variable size queue entries 76 which store the multimedia commands generated by the expert system software 54.

Each queue entry 76 temporarily stores a multimedia command, i.e., an output command specifier 76a and a variable size parameter or output string 76b. In terms of data variable size items. Thus each queue entry 76 has both forward and backward pointers 76c and 76d for creating forward and backward links.

In addition, the queue 74 has two pointers called the queue header 74a and the queue tail 74b, pointing to the beginning and end of the portion of the queue 74 which is currently occupied by queue entries. These pointers are updated by the input filter and dispatch software as items are added and deleted from the queue 74.

As shown in FIG. 3, the queue 74 is supplemented by three buffers: a Question Text Buffer 77, an Explain Text Buffer 78 and a Video Buffer 79. The function of these buffers will be explained shortly.

Every multimedia command that is generated by the system is added to the end of the queue 74. This is true regardless of whether the multimedia command is generated by the expert system software or by the user input (i.e., keyboard or voice input) modules.

Multimedia Dispatch and Output Control.

It should be noted that the multimedia commands stored in the queue 74 are not immediately and automatically executed. Execution and presentation to the user are controlled by a separate dispatch routine 66.

More particularly, all of the multimedia commands stored in the queue 74 are executed and processed whenever a "dispatch" command is executed. As will be explained in more detail below, a dispatch command causes all of the items in the queue 74 to be executed in the same order that they were added to the queue.

"Executing a multimedia command" means (1) generating the voice, video or print output denoted by the command, and/or (2) updating a corresponding one of the buffers 77-79. In addition, the dispatch command causes all of the queue entries 76 to be removed from the queue 74 as they are executed. Thus, after executing a dispatch command the queue is emptied.

TABLE 1

| Command Symbol | MULTIMEDIA COMMANDS Function | Keybd Input | Voice Input | Driving Software |
|---|---|---|---|---|
| | VOICE - QUESTION MESSAGES | | | |
| s | Speak and add text to question buffer. | | | X |
| S | Speak and add text to question buffer, and close buffer. Next "s" or "S" command erases question buffer. | | | X |
| a | Speak specified text, but do not add to question buffer. | | | X |
| m | Clear question buffer. | | | X |
| cntrl-R | Repeat generation of text in question buffer | | X | X* |
| | VOICE - EXPLAIN MESSAGES | | | |
| x | Add text to explain buffer. | | | X |
| X | Add text to explain buffer and close buffer. | | | X |

TABLE 1-continued

| Command Symbol | MULTIMEDIA COMMANDS Function | Keybd Input | Voice Input | Driving Software |
|---|---|---|---|---|
| | Next "x" and "X" will erase explain buffer. | | | |
| z | Speak text in explain buffer. | X | X | X* |
| K | Clear explain buffer. | | | X |
| | VIDEO IMAGES | | | |
| d | Show specified video image or video sequence and store in video buffer. | | | X |
| r | Replay last video. | X | X | X* |
| k | Clear video buffer. | | | X |
| | PRINTED TEXT | | | |
| p | Print specified text. | | | X |
| | OTHER COMMANDS | | | |
| v | Toggle voice input mode between "mike on" and "mike off". | X | X | X* |
| M | Clear the video screen. | | | X |
| Z | Reset all: clear question buffer, explain buffer, video buffer and video screen. | | | X |
| cntrl-L | List Choices: Verbally list the commands that the voice input system will accept. | X | X | X* |

*These commands can be generated by expert system software, but should normally be generated only by user.

This method of separating the definition of what to do (i.e., storing multimedia commands) and when to do it (by executing a dispatch command) prevents the multimedia interface from slowing down the user, because it enables the user to view and respond to text presented on the text display without having to wait for the slower video and voice outputs by the multimedia interface.

Table 1 lists the full set of multimedia commands which can be stored in the queue 74 in the preferred embodiment. As shown in the table, some of the multimedia commands are generated only by the driving software (i.e., the expert system software), while others are normally generated by the user's inputs via the keyboard or voice input system. The commands which are normally generated by user inputs can be also be generated by the expert system software, but the nature of these commands makes this unlikely to be useful in most circumstances.

Consider the following examples of what happens when multimedia commands are executed.

Example 1

The queue contains the following multimedia commands:

```
Command: S
   String: "Select 1 to see a more
            detailed circuit diagram.
            Select 0 to see other related
            circuits."
Command: d
   String: Show images in files:
           F001 to F012, in sequence.
```

When this queue is executed (i.e., dispatched), the text in the first command is spoken and added to the Question Text Buffer 77. A flag in the Question Text Buffer is set noting that this buffer is to be erased the next time that an "s" or "S" command is executed. In addition, the sequence of images specified by the second command are shown on the video display and the specification for this sequence of images is stored in the Video Buffer 79, replacing the previous contents of the Video Buffer, if any.

The actual format of the parameter string for a video command is "FILENAME, PAUSE, START, END", where FILENAME specifies the name of a file containing a video image. When a sequence of images is to be presented, the PAUSE parameter specifies the delay or pause between successive images, and START and END specify the suffixes (i.e., filename extensions) of the filenames storing the first and last images in the sequence.

For example, a sequence of video images can be stored in files with a sequence of filenames such as IMAGEX.001 to IMAGEX.024. The parameter string for the corresponding multimedia command, with a one second pause between images, would be "IMAGEX, 1, 001, 024".

Example 2

The following multimedia commands are added to the queue immediately after the commands in Example 1 are executed:

| | |
|---|---|
| Command: s | |
| String: | "Looking now at the stator of the motor, check the stator windings for burn marks or other obvious defects." |
| Command: K | |
| Command: x | |
| String: | "All sections of the stator must be inspected. Use a mirror..." |
| Command: d | |
| String: | Show image in file: F031. |

When the commands in this queue are executed, the "s" command causes the text in the Question Text Buffer 77 to be deleted, the text of the "s" command to be spoken, and text of the "s" command to be added to the Question Text Buffer 77. The text previously stored in the Question Text Buffer 77 is deleted because the previous Question Text command was an "S" command, which requires that the Question Text Buffer 77 be cleared before new text is stored in that buffer. The "K" command clears the previous contents of the Explain Buffer 78 and the "x" command adds new text to the Explain Buffer 78.

The "d" command causes the image on the video display to be replaced with a new image, and the specification for this image is stored in the Video Buffer 79, replacing the previous contents of the Video Buffer.

The new explain text is not spoken unless and until the user requests further explanation. When the user speaks the command "Explain" into the voice input module, or presses the "Explain" key on the keyboard, a "z" command is added to the queue, and then a dispatch command is generated—which causes the "z" command to be executed and the text in the Explain Buffer 78 to be spoken.

As shown by the above examples, one of the primary uses and advantages of using the queue 74 and its associated buffers 77-79 is that it enables the expert system to set up a specified sequence of multimedia commands in advance. The dispatch command sequentially processes the items in the queue 74, in the same order that they were added to the queue. Therefore the expert system software 54 can control the order that multimedia commands are executed and the order that information is presented to the user by controlling the order in which multimedia commands are added to the queue 74.

The two verbal buffers, called the Question Text Buffer 77 and the Explain Text Buffer 78, provide the flexibility needed for handling common expert system dialogue sequences. The commands listed in Table 1 enable the expert system to have complete control over the contents of the verbal Question and Explain Buffers 77 and 78. In particular, there are commands for clearing each buffer, adding text to each buffer, and adding text to a buffer and marking that buffer so that the next time text is added to it all previously stored text is erased (see S and X commands in Table 1). Thus the contents of each verbal buffer can be added to and cleared by appropriate multimedia commands, allowing the text in each buffer to be managed through the use of a sequence of multimedia commands.

One example of the type of dialogue control provided by the dual verbal buffer scheme is as follows. The text in each multimedia Question Text command ("s", "S" and "a") is normally presented to the user, i.e., spoken or verbalized, when (i.e., just after) the corresponding text is displayed on the text monitor. The text in the Explain Text Buffer, on the other hand, is normally spoken only if the user requests additional explanation of the previously presented materials. Using this dual buffer scheme, an expert user can be spared having to listen to detailed explanations that he does not need, while making additional explanations available to less skilled users.

System Software

Figure 4:
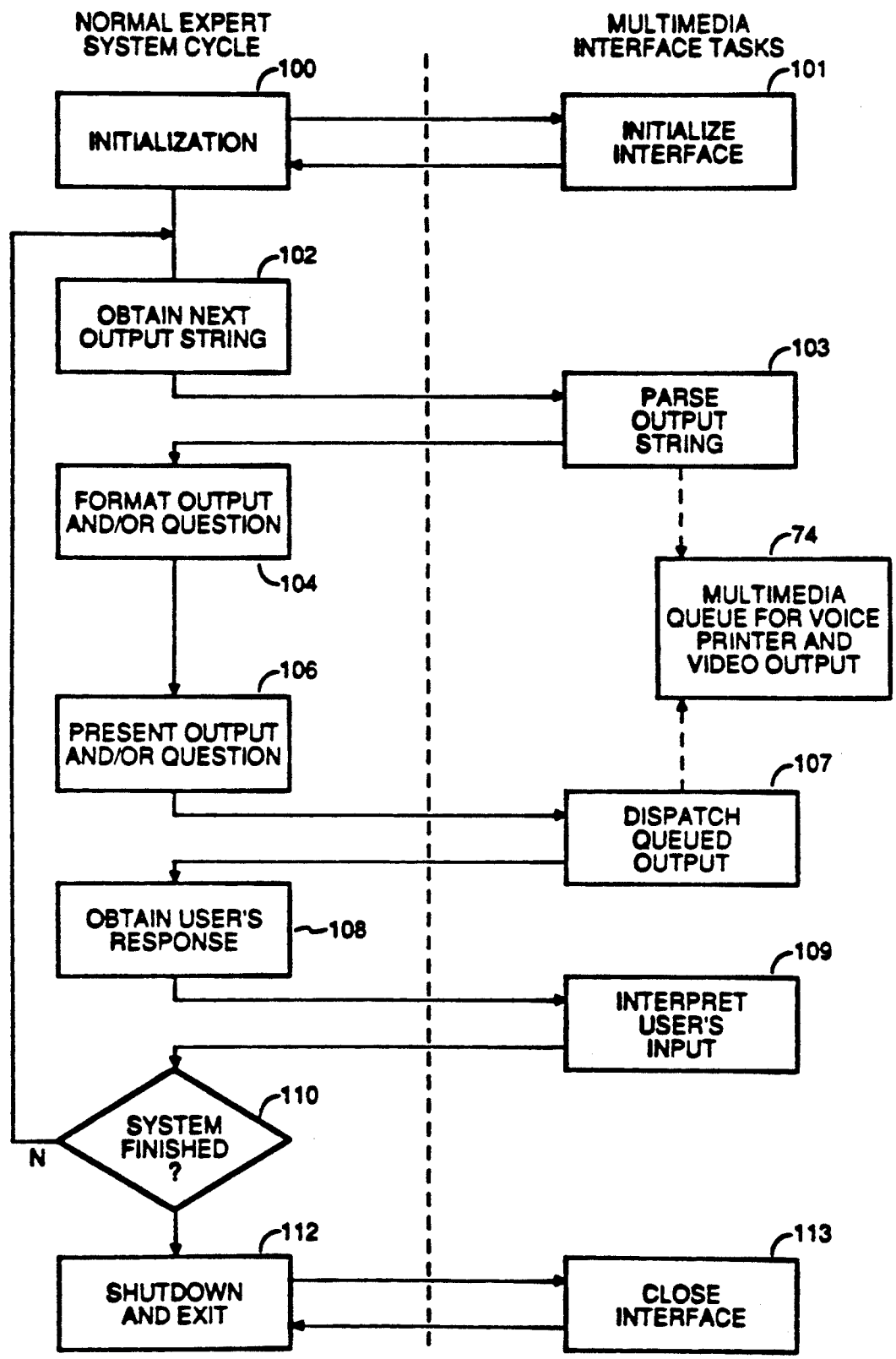
FIG. 4 is a flow chart of the system cycle of an expert system showing the multimedia interface tasks added to an expert system which previously did not have such tasks.

Referring to FIG. 4, there is shown a basic flow chart of the operation of an expert system. The steps on the right side of the flow chart are performed by the multimedia interface, and the steps on the left side of the flow chart are those performed by the control software in a traditional expert system. Thus the operation of the prior art or traditional expert system is represented by the left side of the flow chart, skipping the items on the right side of the Figure.

It should also be noted that in the preferred embodiment all of the steps shown in FIG. 4 are performed by a single processor. In the arrangement shown, the multimedia interface tasks or routines 101, 103, 107, 109 and 113 are subroutines called by the expert system software 54.

As shown in FIG. 4, there are only five multimedia software routines 101, 103, 107, 109 and 113 that must be called by the expert system's software. In addition, the present invention makes it very easy to add the multimedia interface of the present invention to an existing expert system or expert system generator by limiting the number of places that the multimedia interface must be called.

When the expert system software performs its own initialization routine 100, it calls the multimedia interface initialization routine 101, which checks that all of the multimedia modules respond to standard commands and are in working order. If any of the multimedia modules are not working properly, that module is "masked out", so that all multimedia commands directed at these modules will be ignored. More particularly, the initialization routine sets each of four flag values:
VOICEIN_BOARD_GOOD
VOICEOUT_BOARD_GOOD
VIDEO_BOARD_GOOD
PRINTER_BOARD_GOOD
to a value of 1 if the corresponding module is in working order, or to a value of 0 if it is not in working order.

The multimedia modules with flags set to zero are effectively removed from the system. During subsequent operation, the system discards (i.e., does not attempt to dispatch) multimedia commands directed at modules that have been flagged as not being in working order. When the VOICEIN_BOARD_GOOD parameter denotes that the voice input module is not working (i.e., this parameter is set to zero), no voice recognition will occur and the system will not call any of the routines which access the voice input hardware. In this way, the failure of any particular module is prevented from adversely affecting the operation of the other portions of the computer system.

After initialization, the normal processing of the expert system cycle, boxes 100-110, begins. The first step of this cycle is an action by the expert system software: selection of a portion of the expert's knowledge base, resulting in the generation of an output string (box 102). The output string is passed to the multimedia interface for parsing (box 103), which removes the multimedia commands in the output string and adds them to the end of the multimedia command queue 74.

The remaining portions of the output string are passed back to the expert system software, which formats the output string for display (box 104) and presents (box 106) the output string, on the system's text monitor. In addition, a dispatch command is generated (box 107) so that all of the multimedia commands stored in the queue 74 will be executed. Typically, this will result in the generation of a verbal explanation corresponding to the displayed text. As explained above, depending on the commands in the queue 74, a video display and printed information may also be generated.

As shown by the order of the output processing steps 103, 104, 106 and 107, text information is displayed on a text monitor before the multimedia commands stored in the queue 74 are dispatched and presented to the user. This order of presentation facilitates efficient communication with the user because text monitors are generally much faster than voice and printer output, and are usually faster than video because displayed text is static while video output may show a sequence of images. From a functional point of view, however, multimedia commands are executed (i.e., presented to the user) when the corresponding text is displayed on the text display module 58.

The output string usually includes a question to be answered by the user, providing a basis for selecting new information in the knowledge base. Thus the next step of the expert system cycle is to obtain the user's response to the previous output string (box 108).

Inputs received from the user are initially passed to an input interpreter or parser (box 109) so that multimedia commands from the user will be removed from the input string processed by expert system. Instead, multimedia commands input by the user are stored at the end of the command queue 74 and then dispatched immediately.

As discussed below, in the section on User Inputs, before user inputs are processed by the input interpreter, they are verbally acknowledged by speaking the name of the key which has been pressed, or by repeating the verbal command received. User inputs also generate a dispatch interrupt signal or command, which "flushes" the command queue 74 by processing any multimedia commands in the queue 74 so as to clear the command queue 74 and update the queue buffers 7779 without physically performing the commands. The dispatch interrupt furthermore suspends output by the multimedia interface if the presentation of the previously queued outputs has not yet been completed.

The remaining portion of the user's input, after removal of any multimedia commands, is passed back to the expert system software. If the user's input indicates that the user is not yet finished using the system (box 110), processing of the user's input is performed beginning at the top of the expert system cycle (box 102).

However, if the user's input indicates that the user is finished using the system (box 110), the expert system performs a shutdown and exit routine (box 112). Part of the expert system's exit routine is a subroutine call to the Close Interface routine (box 113) which shuts down the multimedia interface.

Adapting Expert System Software to Use Invention

When adapting an expert system to work with the multimedia interface of the present invention, the expert system software needs to be modified in only five places.

As shown in FIG. 4, two of the modifications to the expert system software are simply adding subroutine calls to the expert system's Initialization and Exit routines so as to call the Initialize Interface 101 and Close Interface 113 routines of the multimedia interface.

The expert system software's output routine(s) are modified in two places so that whenever the software 54 would normally display text on the text monitor, if now performs three steps: (1) it passes the output data to an output parser 72 stores in the queue 74 the multimedia commands in the output data and returns the remaining text to the expert system software; (2) it displays the remaining text on the text monitor 58 (i.e., the normal processing of output strings); and (3) it generates a dispatch command (box 107). To do this, subroutine calls to the Parse Output and Dispatch routines are added at appropriate places in the expert system's output software.

The last of the five modifications to the expert system software is to add a subroutine call to the Input Parser (box 109) for processing user inputs before these inputs are processed by the inference software in the expert system.

The above described modifications to the expert system software are partially based on the assumption that multimedia commands are added to the system's knowledge base using the "embedded command" scheme described above. In particular, the placement of the subroutine calls to the output parser and the dispatch routines are based on the "embedded command" scheme.

If the multimedia commands are stored in separate data structures or files from the output text strings, then the expert system's output software would need to be modified to access the separately stored multimedia commands corresponding to the selected output text strings, and to store the selected multimedia commands in the command queue 74. In such a system, steps of the expert system cycle in FIG. 4 could be changed as follows. At the beginning of the loop, starting at box 102, the expert system could first perform the knowledge selection, output formatting and text output operations represented by boxes 102, 104 and 106 before processing the multimedia commands. Then it access the separately stored multimedia commands, call a routine for storing them in the multimedia command queue 74, and then call the dispatch routine. The resulting text and multimedia presentations to the user would look exactly the same as those generated in the preferred embodiment.

User Input and the Input Filter

Referring to FIG. 2, the present invention changes the handling of user inputs. An input filter or interpreter 64 receives all inputs from both the keyboard and voice input modules 56 and 62. To minimize the impact of the multimedia interface on the expert system software 54, all inputs are actually initially received by the same input handling routine in the expert software 54 that normally receives inputs from the keyboard. The input handling routine, however, is modified so that the first thing it does is pass each input to the input filter 64 for processing. In the preferred embodiment, the input filter 64 is considered to be part of the multimedia interface.

User inputs are parsed (inspected) by the input filter 64 so that commands specifically for the multimedia interface are processed and removed from the system's input buffer before the remaining input commands are passed to the expert system software module 54 for "normal" expert system processing. For instance, when the user enters multimedia commands to stop or repeat the display or playback of a video or oral sequence, these commands are processed by the multimedia interface, not by the expert system software module 54.

Before a user input is processed by the input filter 64, the user input causes a sequence of events in the multimedia interface. In particular, if the multimedia interface is in the midst of processing queued commands when the user enters an input of any type, the multimedia system flushes the queued commands (as described in more detail below), stops the outputs being generated by the multimedia output modules, and returns control to the expert system. Enabling the user to interrupt the multimedia interface is very important in a practical system because it allows the user to cut short explanations that he or she doesn't need.

Thus, if the user obtains enough information from the displayed text or the beginning portion of the spoken text to enter a new command, the present invention allows the user to interrupt the presentations by the multimedia interface simply by entering a new command through either the keyboard 55 or microphone 60. To accomplish this function, the dispatcher 66 continually monitors for user inputs. When it sees that a new user input has been entered, it generates a "dispatch interrupt" which stops all physical performance of the queued multimedia commands, halting any video sequences currently being played and any text being spoken. It also flushes the command queue 74 by processing of the multimedia commands in terms of updating the queue buffers 77-79 but without physically performing any visual or audio outputs, and removing the multimedia commands from the queue 74.

More specifically, each user input causes the following sequence of actions to be performed. First, interrupt commands are sent to each of the output media controllers 80, 82 and 84 to suspend output by these output media. In addition, the processing of the remaining items in the queue 74 is completed. However, when the items in the queue are processed, no output presentations are generated. Instead, each multimedia command is executed only to the extent that it affects the state of the buffers 77-79 (see FIG. 3). Thus the resulting state of the buffers 77-79 is the same as though the output commands were processed normally, making the state of the buffers 77-79 independent of how quickly the user responds to the questions posed by the expert system software.

Next, the input filter 64 verbally acknowledges each user input by speaking the name of the key which has been pressed, or by repeating the verbal command received. In the preferred embodiment, this is done by generating a dispatch interrupt, followed by placing a simple voice text command (i.e., an "a" command) on the queue 74 with the text for the verbal acknowledgement, and then generating a dispatch command so that the queued voice command will be executed.

Finally, the user input is processed by input filter 64. If the user input is a multimedia command, the command is placed at the end of the command queue 74 and a dispatch command is generated so that the user's multimedia command will be processed immediately. Otherwise, the user input is passed back to the expert system software 54 for further processing.

Keyboard and Voice Input

Figure 5A:
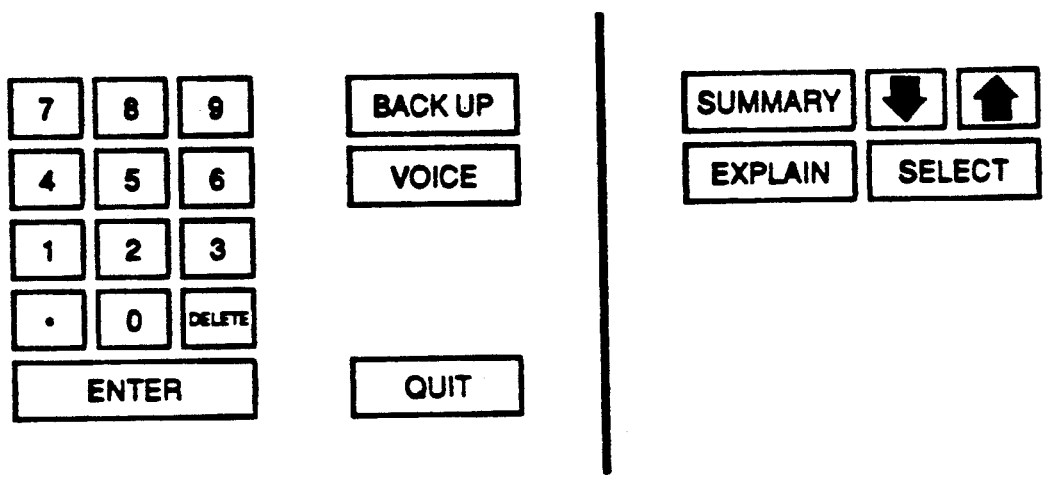
FIGS. 5A and 5B depict the keyboard layout for the portable expert system in FIG. 1.
Figure 5B:
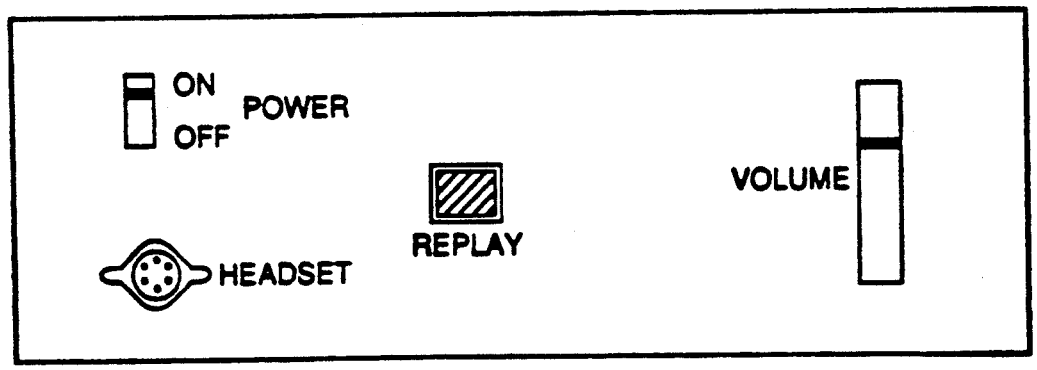

Referring to FIGS. 5A and 5B, the keyboard in preferred embodiment is divided into two sections: the main section shown in FIG. 5A is placed in front of the system's text display 58 (see FIG. 1) while an auxiliary section of the keyboard (shown in FIG. 5B) is located in front of the video display 86. The keyboard section shown in FIG. 5A is a sealed-membrane-type design with snap-dome keys made by or oil, and shock resistant. The individual keys provide positive tactile feedback that can be felt through medium-weight rubber gloves. The multimedia interface provides virtually instantaneous (delay of less than 250 milliseconds) audible feedback of key actuation by verbalizing the identity of the key that was pressed (e.g., if the user presses the delete key, the voice output system says "DELETE"). Between 350 and 500 grams of force is required to actuate the keypad/keyboard switches at 75° F. The keypad can support data input of 80 keystrokes per minute.

The keyboard section shown in FIG. 5B has a standard slide, single-pull, double-throw POWER ON/OFF switch, a sliding knob VOLUME control, and a momentary, normally-open push-button REPLAY key. In addition, the plug for the user's headset 190 is located on the auxiliary section of the keyboard.

The keyboard is designed for single-hand operation, and no simultaneous multiple-keypress functions are required. The number of keys on the keypad have also been minimized, with the constraint that multiple keypress sequences have been eliminated. The keys are arranged on the keypad in three functional groupings: page scroll, function selection, and data entry. The layout of the numerical keys follows the telephone configuration (i.e., 1-2-3 along the top row). Labeling and graphics for the keyboard are applied with silk screening and provide a durable display. Table 2 lists the functions associated with the keys used in the preferred embodiment.

TABLE 2

KEYBOARD FUNCTIONS

| NAME OF KEYBOARD | DESCRIPTION |
|---|---|
| PAGE SCROLL | |
| UP ARROW | SCROLL UP ONE PAGE |
| DOWN ARROW | SCROLL DOWN ONE PAGE |
| FUNCTIONS | |
| SUMMARY | PROVIDE SUMMARY OF SESSION |
| BACKUP | GO TO PREVIOUS MENU |
| QUIT | EXIT FROM EXPERT SYSTEM |
| SELECT | SELECT DESIGNATED MENU ITEM |
| VOICE | TOGGLE VOICE INPUT ON/OFF |
| EXPLAIN | SPEAK ADDITIONAL EXPLANATORY TEXT |
| REPLAY | REPLAY LAST VIDEO |
| VOLUME | SLIDING KNOB CONTROLS VOICE OUT VOLUME |
| POWER | ON/OFF SWITCH FOR ENTIRE SYSTEM |
| DATA ENTRY | |
| 0–9 | DECIMAL VALUES |
| . | DECIMAL POINT |
| BACK UP | DELETE LAST ENTRY |
| ENTER | ENTER SPECIFIED VALUE OR SELECT DESIGNATED ITEM |

It should be noted, however, that all of the keys (except for POWER ON/OFF key, and the VOICE OUT VOLUME sliding knob) in the preferred embodiment are "programmable" function keys. That is, the function of the keys is easily modified through the use of software, and changing the template on the keyboard. Clearly, most systems will have data entry keys similar to those used in the preferred embodiment. Nevertheless it is useful for all or virtually all of the keys to be programmable to enable customizing the multimedia interface for use with different applications, because different applications (.e.g, different expert systems) have different commands that can be conveniently entered through the use of single keystroke.

The PAGE UP and PAGE DOWN keys scroll the text display up and down one page at a time. The data entry keys are used for entering numeric values in standard fashion.

The PREVIOUS MENU, QUIT SESSION, and SESSION SUMMARY keys are specialized functions adapted for use with The Expert Adviser for Combustion Turbines expert system. The PREVIOUS MENU key prompts the expert system to back up to the previously shown menu; the QUIT SESSION key enables the user to abort the user from the standard expert system cycle in a single step; and the SESSION SUMMARY key prompts the expert system to display a summary of the portions of the knowledge base that the user has used during the current session.

The REPLAY key generates a multimedia command that causes the system to regenerate the last defined video image or sequence of video images. The EXPLAIN key generates a multimedia command that causes the system to speak the text currently stored in the EXPLAIN TEXT buffer.

The POWER ON/OFF key turns the power for the entire computer system, including the multimedia interface, on and off. The user should press the QUIT key before turning the system's power off, so that the system can close its files and perform other functions necessary to ensure proper operation of the system. As will be understood by those skilled in the art, in an alternate embodiment the system can be modified so that pressing the POWER ON/OFF key causes the system enter a QUIT command and pause briefly before shutting off the power so as to enable a graceful exit by the expert system and multimedia software.

The VOLUME control key is a sliding knob coupled to a standard volume control potentiometer, which controls the volume of the spoken words generated by speaker 88 (see FIG. 2) in conjunction with the voice output module 82.

The VOICE key enables the user to toggle to status of the voice input module 62 (see FIG. 2) on and off. When voice input is enabled or ON, the user can enter commands verbally via an input microphone. When voice input is disabled or OFF, the user cannot enter commands verbally. This is particularly useful when the user needs to converse with someone or is near someone else who is talking, and the user wants to ensure that the multimedia interface does not interpret such conversations as user commands.

Voice Recognition System Characteristics

The voice recognition system is a commercially available system (the T.I. Speech TM system made by Texas Instruments) capable of distinguishing a vocabulary of 60 words from each of the predetermined speakers. High recognition accuracy is required to prevent user dissatisfaction. In field tests, 98% of input words are correctly understood by system. In most cases, if the system fails to correctly recognize a spoken input, the system requests that the input be repeated rather than make a false recognition. The voice recognition system operates in an environment of up to 85 dB without significant loss of accuracy. A maximum of three passes are used for initial speech recognition template training and testing. The voice recognition device allows syntax node creation after training is completed. Input is via a microphone attached to a lightweight headset 190 (see FIG. 7). Although, wireless communication between the headset and computer would be preferred, the high level of electro-magnetic static in the initial prototypes does not permit it. Instead, the headset is attached to the system by 20 feet of cable. It is anticipated, however, that wireless headsets will be used in at least some future embodiments of the invention.

Verbal input is virtually a necessity in situations where the user's hands are busy performing a manual task. Thus it is important that the user be able to verbally enter all of the commands that could be entered via the system's keyboard.

In the present invention, the verbal input vocabulary is actually larger that the set of keys on the keyboard. The addition input commands provided by the verbal input module include commands necessary for dealing with verbal input.

Table 3 lists the voice recognition vocabulary when voice input is enabled and when voice input is disabled.

As shown in Table 3, when voice input is in "mike off" mode, the voice input module responds to only two verbal commands: MIKE ON, and LIST OPTIONS. The verbal command "MIKE ON" puts the voice input module into "mike on" mode, which enables full operation of the voice input module and switches the input vocabulary used by the voice input module to the list shown in the left hand column of Table 3. Regardless of whether the voice input module is in "mike on" or "mike off" mode, the command "LIST OPTIONS"

prompts the system to verbally list all of the verbal commands that it will accept at the current time.

TABLE 3
VOICE INPUT VOCABULARY

| MIKE ON MODE | MIKE OFF MODE | EQUIVALENT KEY PAD |
| --- | --- | --- |
| mike off | mike on | none |
| list choices | list choices | none |
| none | none | VOICE |
| zero | | 0 |
| one | | 1 |
| two | | 2 |
| three | | 3 |
| four | | 4 |
| five | | 5 |
| six | | 6 |
| seven | | 7 |
| eight | | 8 |
| nine | | 9 |
| ten | | 10 |
| eleven | | 11 |
| point | | . |
| delete | | delete |
| enter | | enter |
| page up | | page up |
| page down | | page down |
| summary | | summary |
| quit | | quit |
| say menu | | none |
| replay | | replay |
| explain | | explain |
| backup | | backup |

When the voice input module is in "mike on" mode, the user can "partially disable" the voice input module simply by giving the verbal command "MIKE OFF". However, "partially disabling" the voice input module actually only changes the vocabulary list that the voice input module will recognize. Thus, when the voice module is "mike off" mode, it does actually still listen to and interpret spoken inputs. In contrast, the VOICE key on the keyboard (shown in FIG. 5A) turns the entire voice input system on and off, thereby enabling and disabling voice input.

Software Modularity

Figure 6:
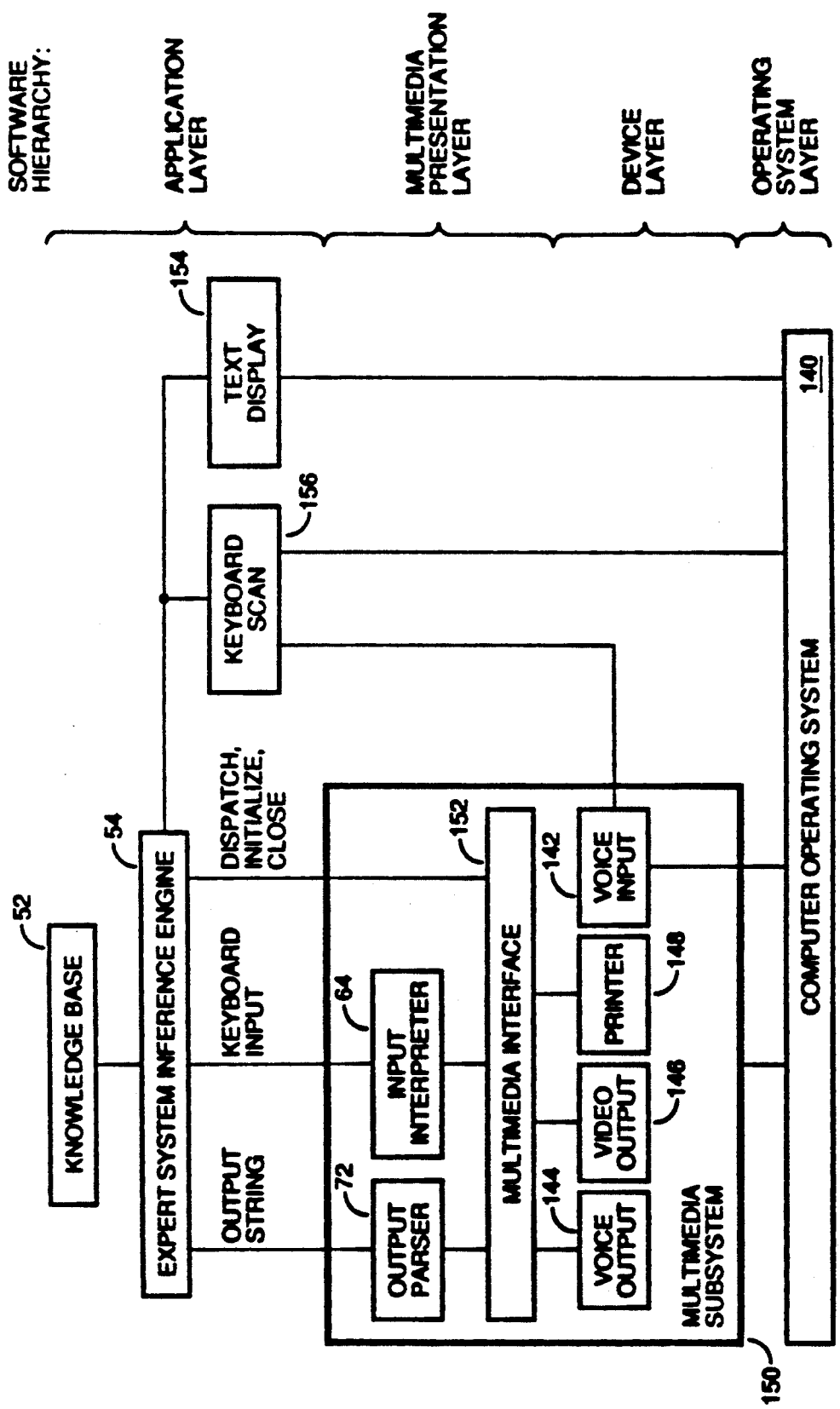
FIG. 6 is a block diagram of the software routines used in the preferred embodiment.

Referring to FIG. 6, the software in the expert system is arranged in a set of hierarchial levels, with each of the lower levels providing services to the routines or modules at the higher hierarchial levels.

At the lowest level, the standard operating system 140 for the computer being used provides standard features such as a disk operating system, memory management, and support routines for the computer's text display and keyboard.

At the second lowest level are the device layer modules 142-148. The device layer modules are the control routines for the multimedia interface's input/output facilities, including control programs for voice input 142, voice output 144, video output 146 and printer output 148.

The device layer modules 142-148 in the multimedia subsystem 150 are modular and independent of the other portions of the system. If any of the multimedia input or output devices is inoperative, the code for that device is shut off and does not affect the operability of the remaining portions of the expert system. More particularly, as discussed above with respect to FIG. 4, the multimedia interface initialization routine 101 checks each of the multimedia devices to determine whether it is operative (i.e., whether it responds to a reset command). If a device is inoperative, a corresponding device availability flag is disabled, which prevents the multimedia interface from calling the corresponding device control routine.

The multimedia presentation layer shown in FIG. 6 contains all of the software which controls or directs the flow of information in and out of the multimedia subsystem 150. As discussed above with respect to FIG. 2, the input interpreter or filter 64 screens keyboard and voice inputs for multimedia commands, so that multimedia commands are stored in a command queue 74 while all other inputs are passed to the expert system software 54. The output parser 72 screens outputs generated by the expert system software 54 so that multimedia commands in the system's outputs are stored in the queue 74 and the other outputs are sent to a text display.

The functions of the remaining portion 152 of the multimedia interface software, including the queue data structure 74, the dispatch routine 66, the initialization routine 101, and the close interface routine 113 have been described above, with reference to FIGS. 2 and 4.

Finally, the application layer in the software hierarchy of FIG. 6 contains the expert system software 54 and its knowledge base 52. Also included in the application layer are a text display routine 154 which formats output strings for display on the system's text monitor 58, and a keyboard scan control routine 156 which interprets keyboard inputs by the user.

In other embodiments of the invention the application layer would include whatever application software that the multimedia interface is being used with.

System Hardware

Figure 7:
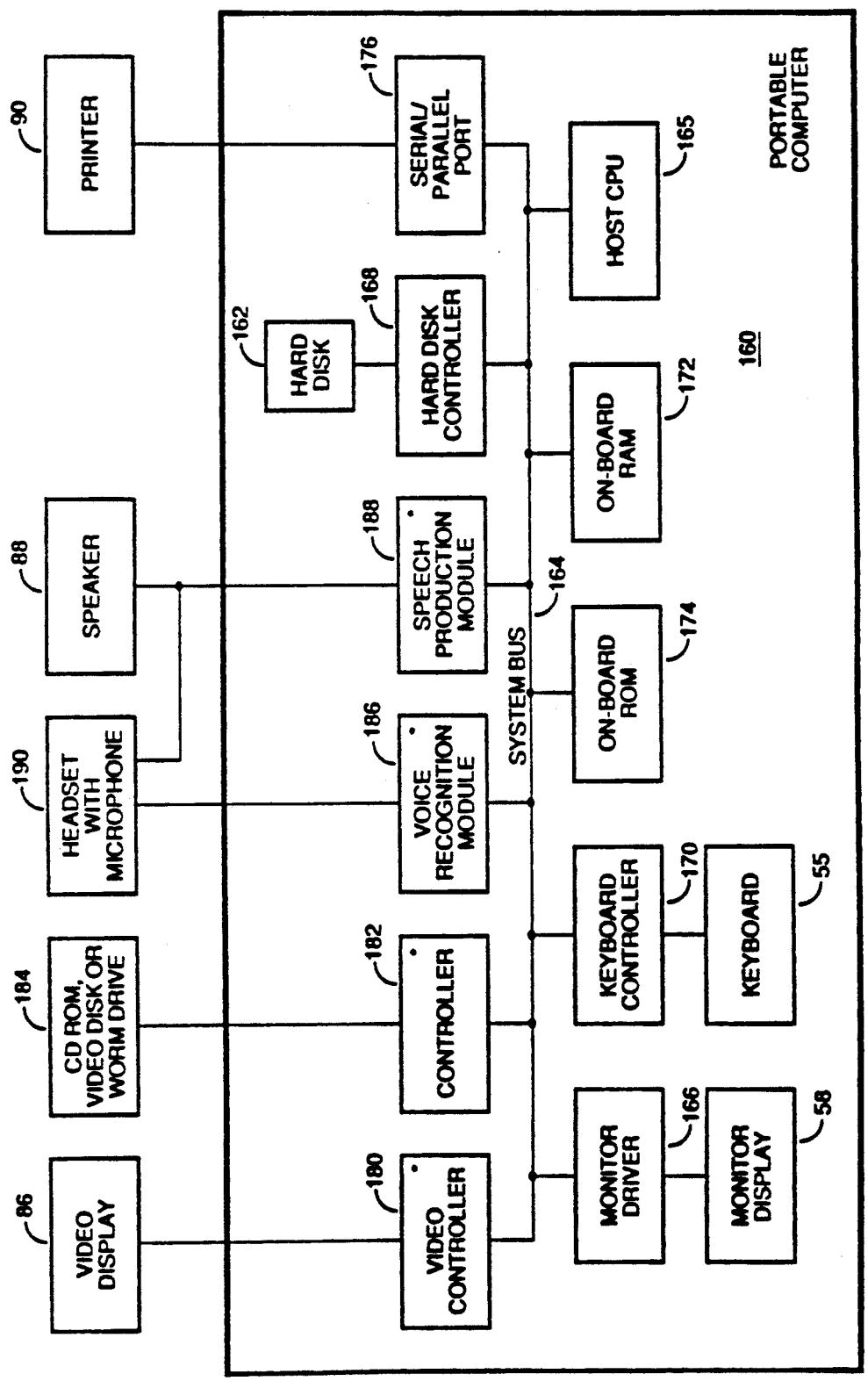
FIG. 7 is a block diagram of the hardware for an expert system incorporating the present invention.

Referring to FIG. 7, the preferred embodiment comprises a modified GRID model 1525 "laptop" or portable computer 160. This computer has an 8-Mhz 80286 microprocessor or CPU 165 and an automatically parking 30-Mbyte internal hard disk 162. Future models of the invention are expected to use even more powerful microprocessors and larger internal hard disks.

As is standard in microcomputer systems, the computer's system bus 164 couples all of the system's peripheral devices to the CPU 165. Thus the system bus 164 couples the CPU not only to the peripheral devices that are built into the portable computer 160, but also the added components for the multimedia interface. The peripheral devices built into the portable computer 160 include a display driver 166, hard disk controller 168, keyboard driver or controller 170, a two-megabyte 172, ROM 174 for storing the system's basic input/output control software, and serial and parallel ports 176.

The peripheral devices for the multimedia interface that are coupled to the system bus 164 include a video display controller 180, a controller 182 for the video image storage device 184, a voice recognition module 186, and a speech production module 188.

The four add-on boards used by the multimedia interface are all compatible with the computer's system bus, and occupy the portions of the systems RAM address space, I/O address space, and interrupt vector shown in Table 4.

TABLE 4

| Module | I/O Address | RAM Address | Int |
| --- | --- | --- | --- |
| Speech Production | 300-30F | | 4 |
| Voice Recognition | | CE000-CFFFF | 5 |
| Video Disk Controller | | D8000-DFFFF | 3 |

TABLE 4-continued

| Module | I/O Address | RAM Address | Int |
|---|---|---|---|
| Video Display Cntrlr | 380-38F | A0000-AFFFF | |

The system also has 640K of RAM occupying addresses 00000–9FFFF for program execution, plus approximately 1.5 megabytes of additional RAM occupying addresses 100000– 27FFFFF which is usable as extended RAM or a virtual disk for speeding up the system, if needed.

The microcomputer's display 58 is a gas plasma text display. This display is separate from the video monitor 86, discussed below. The text display is 10 inches wide by inches in height, with a resolution of 640 by 400 pixels, and supports both upper and lower-case characters. The screen's size and resolution are more than sufficient to enable the average user to read the display from three to four feet away.

The microcomputer's standard keyboard is replaced with the keyboard 55 shown in FIGS. 5A and 5B. The keys in the keyboard 55 are scanned using the computer's standard keyboard controller 170.

A compact video display monitor 86 presents video images to the user, and can overlay images with graphics. The display, model VU 100 made by Hycom, is 5 inches, measured diagonally, handles 4-MHz video bandwidth, and produces 16 shades of gray. The speed of the display is adequate to show multiframe video "movies" or sequences without noticeable flicker or blurring. Since detail information in both video images and schematic displays is of primary concern, the use of a color display was not considered to be important. Future embodiments may use a color video monitor if compact color monitors with sufficient resolution become available.

In the preferred embodiment, video images are stored in a WORM (write once, read many) disk memory 184 made by Maxtor. It is noted that the Maxtor disk memory 184 uses replaceable disks. In an alternate embodiment, the replaceable disks for the Maxtor disk memory could be used to store not only video images, but also a knowledge base and/or application programs which would be copied to the computer's hard disk 162— thereby providing a convenient mechanism for loading new knowledge bases and application software into the system. In another alternate embodiment, a CD-I ROM could be used to store both digital data (i.e., knowledge base data and/or application software) and video information.

For voice output, a text-to-speech synthesizer 160, the Prose 4000 made by Speech Plus, is used to minimize message storage requirements and to make it easier to implement new knowledge bases. Words requiring customized pronunciation can be added to a custom pronunciation dictionary, enabling the text-to-speech synthesizer to enunciate a virtually unlimited vocabulary. The voice output produced by the synthesizer 160 is used to drive both a loudspeaker and also the speakers in a headset 190 worn by the user.

The printer 90, a Seiko model DPU-411, is an integral part of the system and can be accessed through a cover (not shown) behind the video and text displays for changing paper This printer uses 4 inch wide, thermal paper with a print width of 40 columns and has print quality typical for a dot matrix. The printer's built-in interface (not shown), coupled to the computer's parallel port 172, supports graphics and upper- and lower-case text. In future embodiments, a nonthermal full width printer would be preferred, if one of sufficient ruggedness, compact overall size, and weight becomes commercially available.

Power for the system is provided by a standard line current at 120 VAC. The connection is made through a rugged industrial standard plug-in connector, fifteen feet in length. By using standard line current for power, the system can be easily used in virtually all locations without depending on a short life rechargeable battery.

Portability Requirements

As described above, the system is designed to be hand-carried by an individual to various work sites. Therefore the system can be neither larger nor heavier than can be easily carried by one person.

The prototype shown in FIG. 1 is housed in a suitcase-like carrying case 200 that has a volume of 1.7 cubic feet. A card cage (not shown) below the portable computer couples the boards 202 and video disk 204 for the multimedia interface to the computer's system bus. The entire prototype weighs approximately 35 pounds.

As shown in FIG. 1, the video and text displays 86 and 58 are mounted on hinges allowing the displays to be folded against the keyboard 55, which enables the entire system to fit inside a reasonably small housing or carrying case. The text display 58 which comes with the portable computer incorporated in the system is already hinge mounted. The video display is mounted in a similar fashion and is coupled to the text display so that the two displays fold up and down in unison. As shown, the carrying case 200 includes a base member 206 which holds the computer and its peripheral equipment, and a hinged cover member 208 which closes over the entire system when the displays are folded down to provide a sealed, self-contained package.

It is anticipated that the production model, using a lighter weight frame and certain lighter components, will weigh between 25 and 30 pounds. With its carrying case 200 closed and locked, the system is able to withstand ambient weather conditions for a reasonable period of time and is essentially immune to vibrational damage resulting from vehicular transportation.

Video I Sequences and Text for Equipment Maintenance Tasks

As shown in FIG. 1, the video and text displays are juxtaposed to allow side by side presentation of video and text displays.

Figure 8:
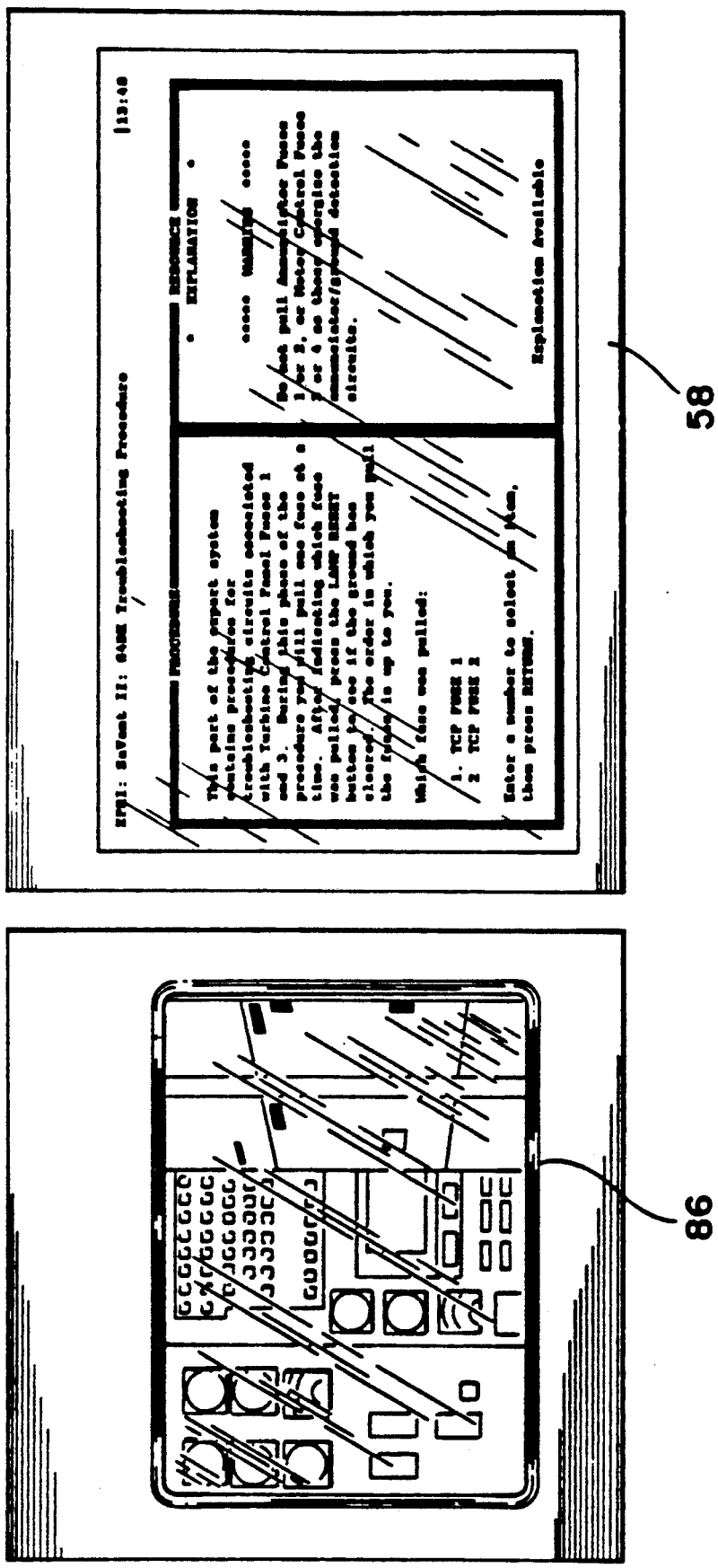
FIG. 8 shows a side by side presentation of a video image and corresponding text generated by a preferred embodiment of the present invention.

Referring to FIG. 8, there is shown a side by side presentation of a video image and corresponding text generated by the preferred embodiment of the invention described above.

One of the original goals and anticipated uses of the present invention is to provide a practical equipment maintenance assistant. To provide practical assistance, the system must be able to show video images of the various pieces of equipment that may need to be repaired, and must also display text explaining how to perform various maintenance and/or repair tasks. In industrial settings, the system must also provide video images showing the locations of various pieces of equipment at a particular site, or at least the typical relative locations of various pieces of equipment in a system.

The preferred embodiment provides all of these capabilities. The expert system's knowledge base includes knowledge regarding the operation and maintenance of a predefined set of equipment, such as the equipment in a particular power plant and the equipment related to a particular set of turbine generators. The knowledge base includes references to (i.e., multimedia commands for) video images, and text to be displayed when the video images are displayed. In addition, the knowledge base includes text to be spoken when corresponding video images and/or text strings are displayed, and additional text to be spoken for users who need or request more detailed explanations.

The expert system software prompts the user, through a series of questions, to identify a particular maintenance task. In some situations, the system identifies a maintenance task based on a set of symptoms related to the performance of various pieces of equipment.

When a particular piece of equipment has been identified, and/or a particular maintenance task has been specified, the system selects and displays one or more video images corresponding to the selected piece of equipment or specified maintenance task. The video images generated can be either a single video image or a specified sequence of images such as a video showing someone perform a typical repair job. At the same time that the video images are being displayed, the system displays text corresponding to those video images, e.g., text related to a specified equipment maintenance task.

In the preferred embodiment, the system also speaks aloud text corresponding to the displayed video images and displayed text, and will speak aloud additional text when the user requests a more detailed explanation.

By providing all of these capabilities in a portable housing, the present invention enables a "computer assistant" to be taken to and used at the locations where various maintenance tasks must be performed.

Dual Processor Embodiments

Figure 9:
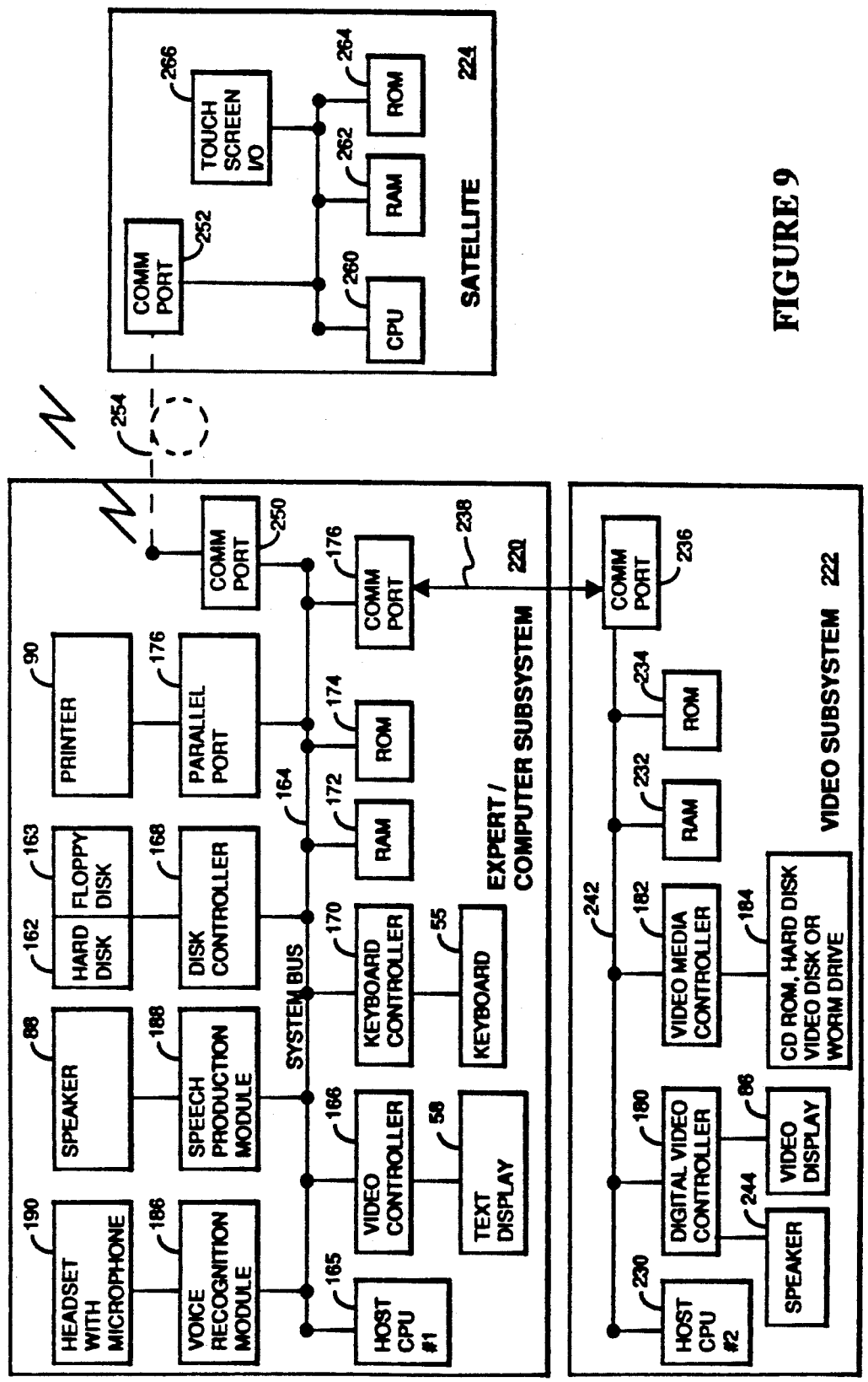
FIG. 9 is a block diagram of a dual processor embodiment of the present invention, plus an optional satellite station remotely located from the main system.

FIG. 9 shows a dual processor embodiment of the present invention. Components of this system which are the same as those in the previously described embodiment have been given the same reference numerals as those shown in FIG. 7. The computer system shown in FIG. 9 includes an computer subsystem 220, a video subsystem 222, and an optional satellite station 224. It should be noted that the computer subsystem 220 and video subsystem 222 are only logically separate, in that each module 220 and 222 has its own CPU with its own, separate system bus—physically these two module's both reside in a common housing (see FIG. 10).

It may also be noted that while computer subsystem 220 runs expert system software in this preferred embodiment, many aspects cf the present invention would be applicable to computer systems running other types of application software.

One of the advantages of this embodiment is that it offloads video processing tasks from the CPU 165 which runs the expert system software. As a result, the expert system application runs faster. The video subsystem 222, because it executes its functions in parallel with and independently of the computer subsystem 220, can be given more capabilities without impacting on the performance of the computer subsystem.

There is relatively little communications traffic between the computer subsystem 220 and the video subsystem 222. The only communications needed are commands sent by the computer subsystem 220 which specify the video images and video sequences that are to be displayed on video display 86. Therefore separating expert system functions from video output functions does not burden the processors in modules 220 and 222 with much in the way of inter-module communications.

The computer subsystem 220 contains most of the components of the previously described computer system, except for the video display 86, the video controller 180, a video data storage device 184 and the corresponding controller 182. A floppy disk drive 163 is included with the hard disk drive 162 to facilitate updating software and databases stored in the system. Messages and text generated by the expert system software are displayed on a flat panel screen 186. All the voice input/output described above are equally applicable to this dual processor embodiment. However, unlike the previously described embodiments, the computer subsystem module 220 is coupled by a communication port 176 to a second computer subsystem—the video subsystem 222.

The video subsystem 222 contains a second CPU 230, RAM 232 and ROM 234 for executing and storing software which performs a set of predefined video tasks, and a communication port 236 for coupling the video subsystem 222 to the computer subsystem 220, via a communications line or network 238. The video subsystem 222, of course, also includes a video display 86 (e.g., a flat, VGA gas plasma display), a video controller 180 for that display, a high capacity data storage device 184 for storing video images and the corresponding controller 182. The video data storage device 184 may be a CD ROM, Video Disk, WORM drive, a hard magnetic disk or any other high capacity media which allows random access to stored video images. These components are all interconnected by a system bus 242.

The video storage media 184 stores and displays digitized video images corresponding to subject matter handled by the application program running in the computer subsystem. For example an expert system for performing trouble shooting, diagnostics and maintenance in an electrical power generator plant would require images of selected pieces of equipment in the plant, including images of those pieces of equipment during various phases of testing and repair tasks. For the purposes of this description, the term "maintenance tasks" includes trouble shooting, diagnostic and other tasks related to the testing and upkeep of a defined set of equipment.

The video storage media must be a random access storage device so that selected video images or sequences of images can be retrieved quickly. In the preferred embodiment, the video storage media 184 is a 1 gigabyte optical (WORM) drive sold by Maximum Storage. Each removable cartridge for this drive is capable of storing approximately 1.5 hours of motion video, or a mixture of 30 minutes of motion video, 7500 high resolution still frame pictures, nine-hours of audio and over 22,000 pages of text.

In the preferred dual processor embodiment, both CPUs 165 and 230 are 16-Mhz 80386SX microprocessors made by Intel. These microprocessors are selected because they are powerful and reasonably priced computational units as of the time that this document is being filed. In the future, even more powerful microprocessors will be used.

Both the text and video displays in the preferred embodiment are large (ten-inch diagonal), flat, gas plasma VGA screens. Future embodiments of the video subsystem 222 may include a video port for coupling an optional, external color video monitor to the system for better viewing of video images.

As noted in FIG. 9, the video display controller 180 in this embodiment is called a digital video controller, because it includes circuitry and software for handling a wide range of video processing functions. Controller 180 in the preferred embodiment includes a Intel DVI (digital video interactive) module (including a DVI capture board and a DVI delivery board). The DVI circuitry enables this video subsystex to manage drawings, photographs, still and animated graphics, video stills, full-motion video and motion video with graphic overlays. The quality of the pictures generated using the DVI circuitry can match or exceed the quality of commercial video format recordings, adding greatly to the usefulness of the multimedia output of the system. The DVI circuitry also can retrieve prerecorded digital soundtracks, including digitized stereo recordings, from the optical drive 184 for transmission to a speaker 244.

In some implementations of the system, the digital video controller 180 includes digital video delivery circuitry, but not digital video capture circuitry, because all digital video data will be processed by other computers, with the resulting files being loaded on the video subsystem's disks. Digital video capture circuitry is used to add pictures to the system "in the field", e.g., using a still camera, video camera or a digitizing scanner coupled to the digital video controller 180 in the video subsystem 22. In particular, the video capture circuitry portion of the video controller 180 allows the system's video "database" (stored on video memory media 184) to be tailored for the actual equipment used at a particular installation. For instance, the expert system for maintaining a particular power plant can be customized using a video camera and the video subsystem to record images of the generators and related equipment in that particular power plant.

In summary, the computer subsystem 220 uses the video subsystem 222 to display a wide variety of video images in response to queries from the users of the system. By providing a separate microprocessor 230 to handle the retrieval and displaying of video images, and also the playing of prerecorded audio sequences, the execution speed of the expert system application in the computer subsystem 220 is improved.

Figure 10:
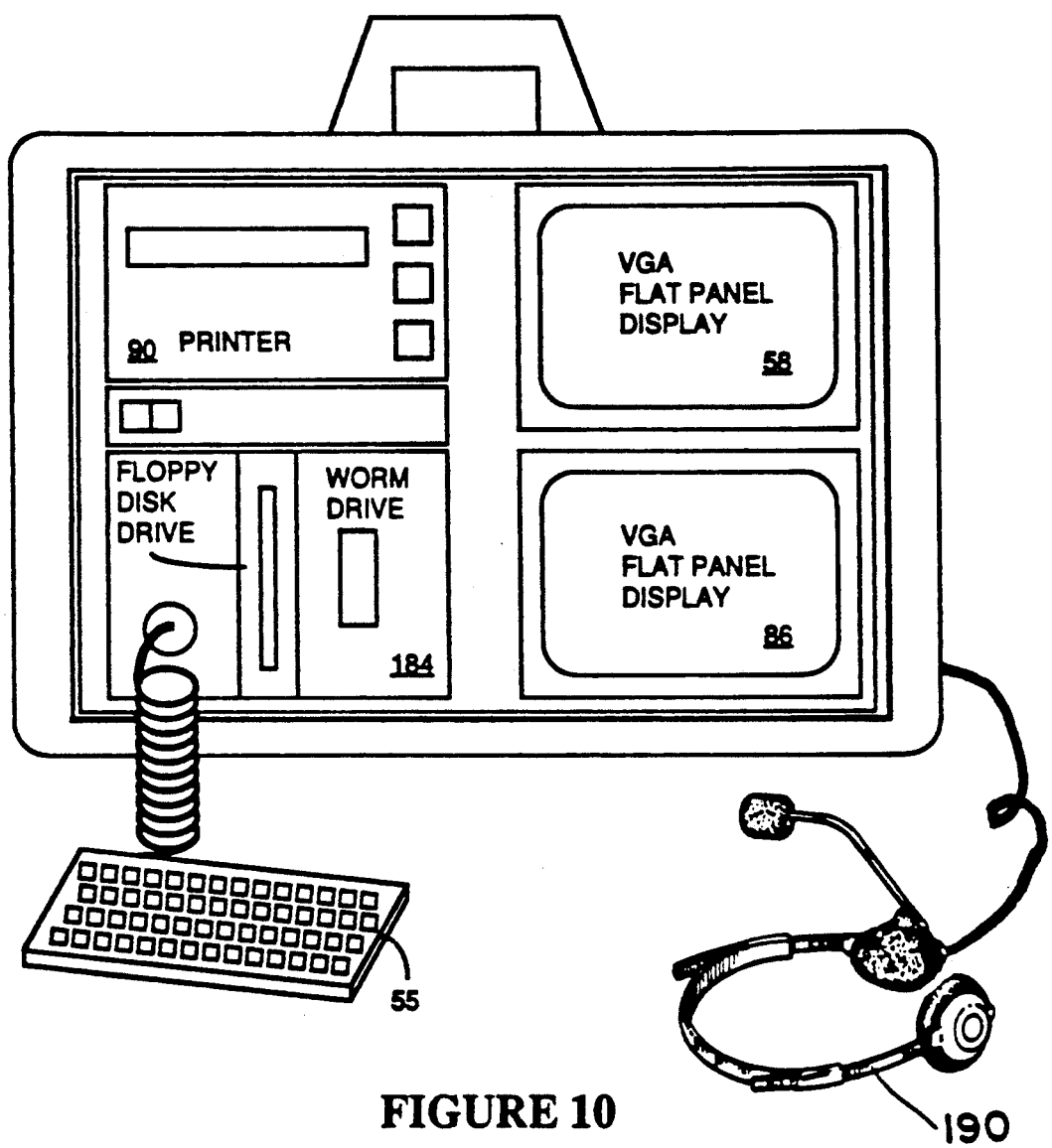
FIG. 10 depicts the system of FIG. 9 in a housing which has width and height comparable to a standard attache case.

FIG. 10 depicts the system of FIG. 9 in an aluminum housing having dimensions (measured in inches) of 17×20×12, which is comparable in size to a small suitcase.

Satellite Station

Another aspect of the system shown in FIG. 9, is the ability to add a satellite station 224. The satellite station 224 is coupled to the computer subsystem 220 via communication ports 250 and 252 in the computer subsystem and satellite, respectively. In some implementations, these communication ports will be physically interconnected by a communications cable 254, and in other implementations the satellite 224 will communicate with the host computer system via radio signals.

The satellite 224 includes not only a communication port 252 for communicating with the host computer subsystem 220, but also its own CPU 260, one to ten megabytes of RAM 262 for storing images and other data downloaded from the computer subsystem 220, ROM 264 for storing operating software, and a touch screen 266 for input and output communications with a user.

The first implementation of the satellite 224 uses a GridPad computer made by Grid Systems for the satellite because it is easily held in one hand and has all the basic capabilities needed for this application. Other "palmtop" computers such as the PTC-500 made by Sony could be used in other implementations of the invention.

Satellite stations are particularly useful in environments where it is inconvenient or impossible to bring the complete system. A palmtop satellite station can be carried into tight quarters or put near the user's face while performing a physically difficult task so that the user can easily view the screen and enter requests for additional information without having to make unnecessary movements. In many industrial environments a communications tether (e.g., coaxial cable) 254 will be needed to couple the satellite to the host computer system 220, in place of a radio connection, because of the electrical noise generated by nearby machinery. The use of a satellite station has some overhead associated with communications between modules, but greatly increases the number of applications in which the systex is useful.

Alternate Embodiments

It should be understood that from the broadest perspective the present invention is a multimedia interface usable with many types of expert systems as well as other application software. Thus one set of alternate embodiments of the present invention is derived from the fact that the invention is usable with a variety of expert systems.

The most ambitious embodiment of the present invention currently being developed is an expert system called the START UP ADVISOR, which diagnoses a wide range of start up failures on gas turbines used for electrical power generation. While this expert system's knowledge base will be much more extensive than the one in the preferred embodiment described above, the multimedia interface of the START UP ADVISOR will be virtually identical to the one in the preferred embodiment.

As will be understood by those skilled in the art, in other embodiments of the invention the multimedia commands generated by the expert system do not need to be "embedded" in the text strings which are to be displayed on the system's text monitor. The method of embedding multimedia commands in the text was devised so as to minimize the number of changes that would need to be made to an existing expert system in order to incorporate the present invention.

When designing a new expert system which will include the multimedia features of the present invention, the "output parser" can be dispensed with simply by providing separate storage for the display text and the multimedia commands. In the simplest such example, display text would be stored in another array. When displaying a selected set of text on the system's text monitor, the corresponding multimedia commands would set to a queue. The only difference from the above described preferred embodiment is that there is no need to "parse" the multimedia commands from the output generated by the inference software.

In another example, using the well known "code book" model for accessing a large database, when the expert system's inference software selects a portion of the knowledge base, the software will actually select a set of reference or code book pointers. These pointers will directly or indirectly denote display text, video displays, text for voice generation, and so on. Using these pointers the appropriate text can be directed to the system's text monitor while other sets of information are sent to the system's multimedia queue.

As noted earlier, the present invention can be used with expert systems which do not work along the lines of the simplified expert system model described above. From a more general perspective, the knowledge base in an expert system stores a specified set of information. The exact manner in which that information is organized is not particularly important for the purposes of the present invention. What is important from the perspective of the present invention is that the inference software in the expert system accesses selected portions of the information in the knowledge base, in accordance with the user's commands.

Using the selected information, the expert system displays text on a text monitor and generates multimedia commands denoting additional information that can be presented by a multimedia interface when the corresponding text is displayed. The method of storing and/or generating these multimedia commands may vary widely from system to system. In accordance with the present invention, however, at least some of the multimedia commands must be queued, and the system must also have a dispatcher for executing the queued multimedia commands. Generally, the system will automatically generate certain predefined dispatch commands when displaying corresponding text, and will generate other dispatch commands at the user's request.

From an even broader perspective, the invention can be used with a wide range of application programs. To work with the present invention, the application program will generate multimedia commands denoting information that can be presented to the user by a multimedia interface. In addition, the system must queue at least some of the multimedia commands, and provide a dispatcher for executing the queued multimedia commands.

Another set of alternate embodiments of the present invention will inevitably arise as the hardware available for each of the input and output media improve over time, thereby improving the portability and usefulness of the invention. Even during the time during which the preferred embodiment was developed, lower weight and higher quality components became available and were used to replace previously selected components. Along these lines, it is entirely predictable that the size, weight and quality of portable video monitors and text monitors will improve over time. In fact, it is possible that it will become practical to use a single monitor for both text and video images, with the text and video images occupying different portions of a split screen.

In another example, it is likely that both voice input and speech generation technologies will improve over time. Improvements in making speech recognition speaker-independent will increase the range of voice input commands that it is practical to use, and improvements in text-to-speech conversion will increase the clarity and usefulness of synthesized speech.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. In a computer system, the combination comprising:
a first data processing unit coupled to a first display apparatus;
first memory means, coupled to said first data processing unit, for storing application software, wherein said application software displays messages on said first display apparatus and also transmits video display instructions;
a second data processing unit coupled to a second display apparatus, and coupled to said first data processing unit so as to receive said transmitted video display instructions;
random access video memory means, coupled to said second data processing unit, for storing a multiplicity of digitized video images; and
a digital video controller, coupled to said second data processing unit and to said video memory means, that displays on said second display apparatus selected ones and selected sequences of said digitized video images stored in said video memory means in accordance with said video display instructions transmitted by said application software;
said application software including means for coordinating said video images displayed on said second display apparatus with said messages displayed on said first display apparatus.

2. In a computer system, the combination comprising:
a first data processing unit coupled to a first display;
first memory means, coupled to said first data processing unit, for storing application software, wherein said application software displays messages on said first display apparatus and also transmits video display instructions; wherein said application software includes means for defining a predefined set of pieces of equipment and a predefined set of maintenance tasks in conjunction with corresponding ones of said pieces of equipment;
a second data processing unit coupled to a second display, and coupled to said first data processing unit so as to receive said transmitted video display instructions;
random access video memory means, coupled to said second data processing unit, for storing a multiplicity of digitized video images, a multiplicity of said digitized video images stored in said video memory means corresponding to one or more of said pieces of equipment;
a digital video controller, coupled to said second data processing unit and to said video memory means, that displays on said second display apparatus selected ones and selected sequences of said digitized video images stored in said video memory means in accordance with said video display instructions transmitted by said application software; and
user input means for specifying one of said equipment maintenance tasks to be performed in conjunction with corresponding ones of said pieces of equipment;
said application software including software that responds to specification of an equipment maintenance task, entered via said user input means, by generating video display instructions that instruct said digital video controller to display a single stored digitized video image for certain predefined equipment maintenance tasks and a sequence of said stored digitized video images for other predefined equipment maintenance tasks; said application software simultaneously displaying on said first display messages corresponding to said video images;

whereby said computer system can be used to provide assistance in the form of video sequences and message displays to a person performing a specified equipment maintenance task.

3. The combination set forth in claim 2, wherein said user input means includes voice input and recognition means for receiving spoken user commands.

4. The combination set forth in claim 2, further including voice output means, coupled to said first data processing unit, for converting specified text strings into synthesized speech;

said application software generating and transmitting to said voice output means specified text strings.

5. The combination set forth in claim 2, including portable housing that houses said computer system; said portable housing enabling said computer system to be taken to and used at the place where a selected piece of equipment is located.

6. In a computer system, the combination comprising:

a first data processing unit coupled to a first display;

first memory means, coupled to said first data processing unit, for storing application software, wherein said application software displays messages on said first display and also transmits video display instructions;

a second data processing unit coupled to a second display, and coupled to said first data processing unit so as to receive said transmitted video display instructions;

random access video memory means, coupled to said second data processing unit, for storing a multiplicity of digitized video images;

a digital video controller, coupled to said second data processing unit and to said video memory means, that displays on said second display apparatus selected ones and selected sequences of said digitized video images stored in said video memory means in accordance with said video display instructions transmitted by said application software; and an audio speaker coupled to said digital video controller;

said random access video memory means storing both digitized video images and a multiplicity of distinct digitized audio sequences;

said application software transmitting audio play instructions to said second data processing unit; said second data processing unit forwarding corresponding audio play instructions to said digital video controller; and said digital video controller sending selected digitized audio sequences stored in said video memory means in accordance with said audio play instructions transmitted by said application software;

whereby said computer system can play audio sequences in conjunction with video sequences and message displays.

7. The combination set forth in claim 6, wherein said application software includes means for defining a predefined set of pieces of equipment and a predefined set of maintenance tasks in conjunction with corresponding ones of said pieces of equipment;

a multiplicity of said digitized video images stored in said video memory means corresponding to one or more of said pieces of equipment, said combination further including user input means for specifying one of said equipment maintenance tasks to be performed in conjunction with corresponding ones of said pieces of equipment;

said application software including software that responds to specification of an equipment maintenance task, entered via said user input means, by generating video display instructions that instruct said digital video controller to display a single stored digitized video image for certain predefined equipment maintenance tasks and a sequence of said stored digitized video images for other predefined equipment maintenance tasks; said application software simultaneously displaying on said first display messages corresponding to said video images;

whereby said computer system can be used to provide assistance in the form of video sequences and messages to a person performing a specified equipment maintenance task.

8. The combination set forth in claim 7, wherein said user input means includes voice input and recognition means for receiving spoken user commands.

9. The combination set forth in claim 7, further including voice output means, coupled to said first data processing unit, for converting specified text strings into synthesized speech;

said application software generating and transmitting to said voice output means specified text strings.

10. In a computer system, the combination comprising:

a first data processing unit coupled to a first display;

first memory means, coupled to said first data processing unit, for storing application software, wherein said application software displays messages on said first display and also transmits video display instructions;

a second data processing unit coupled to a second display, and coupled to said first data processing unit so as to receive said transmitted video display instructions;

random access video memory means, coupled to said second data processing unit, for storing a multiplicity of digitized video images;

a digital video controller, coupled to said second data processing unit and to said video memory means, that displays on said second display selected ones and selected sequences of said digitized video images stored in said video memory means in accordance with said video display instructions transmitted by said application software; and a portable, handheld satellite station, having a third data processing unit;

a third display;

communication means for communicating with said first data processing unit; and user input means for interacting with said application software;

said first and second data processing units including means for transmitting messages and video images to said satellite station;

whereby said satellite station allows use of said computer system by a peripatetic/ambulatory user without having to move said entire computer system.

11. The combination set forth in claim 10, wherein said application software includes means for defining a predefined set of pieces of equipment and a predefined set of maintenance tasks in conjunction with corresponding ones of said pieces of equipment;
a multiplicity of said digitized video images stored in said video memory means corresponding to one or more of said pieces of equipment,
said combination further including user input means for specifying one of said equipment maintenance tasks to be performed in conjunction with corresponding ones of said pieces of equipment;
said application software including software that responds to specification of an equipment maintenance task, entered via said user input means, by generating video display instructions that instruct said digital video controller to display a single stored digitized video image for certain predefined equipment maintenance tasks and a sequence of said stored digitized video images for other predefined equipment maintenance tasks; said application software simultaneously displaying on said first display messages corresponding to said video images;
whereby said computer system can be used to provide assistance in the form of video sequences and message to a person performing a specified equipment maintenance task.

12. The combination set forth in claim 11, wherein said user input means includes voice input and recognition means for receiving spoken user commands.

13. The combination set forth in claim 11,
further including voice output means, coupled to said first data processing unit, for converting specified text strings into synthesized speech;
said application software generating and transmitting to said voice output means specified text strings.

14. The combination set forth in claim 11, including portable housing that houses said computer system;
said portable housing enabling said computer system to be taken to and used at the place where a selected piece of equipment is located.

* * * * *